(12) United States Patent
Huang (10) Patent No.: US 9,568,740 B2
(45) Date of Patent: Feb. 14, 2017

(54) SIX-PRIMARY SOLID STATE ILLUMINATOR AND OPERATING METHOD USING THE SAME

(71) Applicant: DELTA ELECTRONICS, INC., Kuei San (TW)

(72) Inventor: June-Jei Huang, Kuei San (TW)

(73) Assignee: DELTA ELECTRONICS, INC. (TW)

( * ) Notice: Subject to any disclaimer, the term of this patent is extended or adjusted under 35 U.S.C. 154(b) by 386 days.

(21) Appl. No.: 14/493,850

(22) Filed: Sep. 23, 2014

(65) Prior Publication Data

US 2016/0041399 A1 Feb. 11, 2016

(30) Foreign Application Priority Data

Aug. 6, 2014 (TW) .............................. 103126836 A (51) Int. Cl.
| | | |
|---|---|---|
| G03B 21/14 | (2006.01) | |
| G02B 27/22 | (2006.01) | |
| G02B 27/26 | (2006.01) | |
| G02B 27/28 | (2006.01) | |
| G03B 21/00 | (2006.01) | |
| H04N 9/31 | (2006.01) | |

(52) U.S. Cl.
CPC ........... *G02B 27/2235* (2013.01); *G02B 27/26* (2013.01); *G02B 27/283* (2013.01); *G02B 27/286* (2013.01); *G03B 21/006* (2013.01); *H04N 9/3102* (2013.01); *H04N 9/3108* (2013.01)

(58) Field of Classification Search
CPC ........ H04N 9/097; H04N 9/31; H04N 9/3102; H04N 9/3105; H04N 9/3108; G03B 21/003; G03B 21/005; G03B 21/006; G03B 21/008; G03B 21/204; G02B 27/2207; G02B 27/26; G02B 27/283; G02B 27/286
USPC ..... 353/7, 20, 31, 33, 34, 37; 349/5, 7, 8, 9; 348/742, 743, 771
See application file for complete search history.

(56) References Cited

U.S. PATENT DOCUMENTS

2005/0270775 A1* 12/2005 Harbers ............. G02B 27/1046
362/231
2007/0127121 A1   6/2007 Maximus et al.
(Continued)

FOREIGN PATENT DOCUMENTS

| CN | 101968573 | 2/2011 |
|---|---|---|
| TW | 278307 | 6/1996 |
| TW | 201339641 | 10/2013 |

*Primary Examiner* — William C Dowling
(74) *Attorney, Agent, or Firm* — Hauptman Ham, LLP (57) ABSTRACT

A six-primary solid state illuminator includes a first light source, a second light source, a third light source, a first photoluminescence device, a second photoluminescence device, and a multi-band filter. The first light source provides a light with a first wavelength. The first photoluminescence device under excited state provides a light with a second wavelength. The second light source provides a light with a third wavelength. The third light source provides a light with a fourth wavelength. The second photoluminescence device under excited state provides a light with a fifth wavelength. The light beams of the first light source, the second light source, and the first photoluminescence device are converted to a first primary combination after passing through the multi-band filter. The light beams of the third light source and the second photoluminescence device are converted to a second primary combination after reflected at the multi-band filter.

16 Claims, 8 Drawing Sheets

(56) References Cited

U.S. PATENT DOCUMENTS

| | | |
|---|---|---|
| 2009/0213330 A1 | 8/2009 | Silverstein et al. |
| 2010/0208342 A1 | 8/2010 | Olsen |
| 2011/0051102 A1 | 3/2011 | Ogura et al. |
| 2011/0279782 A1* | 11/2011 | Huang .............. H04N 9/3111 353/31 |
| 2012/0182712 A1* | 7/2012 | Huang .............. G03B 21/2013 362/84 |
| 2013/0208247 A1* | 8/2013 | Huang .............. G02B 27/2207 353/7 |
| 2015/0177599 A1* | 6/2015 | Huang .............. G03B 21/142 353/31 |
| 2015/0253653 A1* | 9/2015 | Fujita .............. H04N 9/3111 353/31 |

* cited by examiner

SIX-PRIMARY SOLID STATE ILLUMINATOR AND OPERATING METHOD USING THE SAME

RELATED APPLICATIONS

This application claims priority to Taiwan Application Serial Number 103126836, filed Aug. 6, 2014, which is herein incorporated by reference.

BACKGROUND

Field of Invention

The present invention relates to a six-primary solid-state illuminator. More particularly, the present invention relates to a six-primary solid-state illuminator providing a stereoscopic display.

Description of Related Art

By exploiting the binocular parallax of humans, a stereoscopic display device provides two slightly different images to an observer's left and right eyes so as to generate a stereoscopic image for the observer. According to the ways of providing the different images, the general stereoscopic display technologies are divided into a polarization 3D technology, an anaglyphic 3D technology, and a wavelength multiplexing 3D technology.

The stereoscopic display device with the wavelength multiplexing technology generates a stereoscopic image by providing images with different wavelength ranges to observers. The general color display device produces various colors in the color space by mixing the additive primary colors, i.e. red (R), green (G), and blue (B). Therefore, the stereoscopic display device with the wavelength multiplexing technology can separately produce left-eye images with a set of primary colors R1, G1, and B1, and right-eye images with the other set of primary colors R2, G2, and B2.

The conventional stereoscopic display device with the wavelength multiplexing technology produces two sets of three primary colors by using two light sources. A laser is generally used as the light source. However, the efficiency of the laser with green wavelength is low, and the laser is expensive such that the proportion of the cost for the light source is significantly high. Therefore, how to improve the aforementioned disadvantages when providing two sets of three primary colors is a constant striving in the industry.

SUMMARY

An aspect of the present invention provides a six-primary solid-state illuminator. In addition to laser sources, the six-primary solid-state illuminator includes photoluminescence devices with phosphor material as light sources, such that two primary-color combinations that the wavelengths are not overlapped each other are produced. Furthermore, the six-primary solid-state illuminator and a controller are combined for switching on the laser sources, such that the two primary-color combinations outputting alternately are used for the light sources with a stereoscopic display.

An aspect of the present invention provides a six-primary solid-state illuminator including a first light source, a first optical module, a second light source, a third light source, a second optical module, and a multi-band filter. The first light source is used for providing a first light beam with a first wavelength. The first light beam passes through the first optical module and enters a first photoluminescence device, in which the first photoluminescence device is excited by a part of the first light beam and provides a second light beam with a second wavelength. The other part of the first light beam is reflected at the first photoluminescence device, in which the reflective first light beam and the second light beam travel toward and are reflected at the first optical module. The second light source is used for providing a third light beam with a third wavelength, in which the third light beam passes through the first light optical module. The third light source is used for providing a fourth light beam with a fourth wavelength. The fourth light beam is reflected at the second optical module and enters a second photoluminescence device, in which the second photoluminescence device is excited by a part of the fourth light beam and provides a fifth light beam with a fifth wavelength. The other part of the fourth light beam is reflected at the second photoluminescence device, in which the reflective fourth light beam and the fifth light beam travel toward and pass through the second optical module. The multi-band filter is used for receiving the first light beam, the second light beam, and the third light beam coming from the first optical module and receiving the fourth light beam and the fifth light beam coming from the second optical module. The first light beam, a part of the second light beam, and the third light passing through the multi-band filter are converted to a first primary-color combination. The fourth light beam and a part of the fifth light beam reflected at the multi-band filter are converted to a second primary-color combination. The first primary-color combination and the second primary-color combination travel along the same direction.

In one or more embodiments, the first optical module includes a first polarizing beam splitter and a first wave plate, and the second optical module includes a second polarizing beam splitter and a second wave plate. Polarization of the first light beam and the third light beam corresponding to the first polarization beam splitter is a first polarization, such that the first light beam and the third light beam pass through the first polarizing beam splitter. The first wave plate is disposed at a side of the first photoluminescence device, such that the first light beam reflected at the first photoluminescence device passes through the first wave plate and is converted to a second polarization corresponding to the first polarizing beam splitter. The first light beam with the second polarization is reflected at the first polarizing beam splitter. The fourth light beam corresponding to the second polarization beam splitter is the second polarization, such that the fourth light beam is reflected at the second polarizing beam splitter. The second wave plate is disposed at a side of the second photoluminescence device, such that the fourth light beam reflected at the second photoluminescence device passes through the second wave plate and is converted to the first polarization corresponding to the second polarizing beam splitter. The fourth light beam with the first polarization passes through the second polarizing beam splitter.

In one or more embodiments, in which the first polarization is p polarization, and the second polarization is s polarization.

In one or more embodiments, the six-primary solid-state illuminator further includes a prism group, in which a total internal reflection gap is defined in the prism group. An interface between the prism group and the total internal reflection gap is used for reflecting light beam coming from the multi-band filter to a target position.

In one or more embodiments, in which the prism group includes a prism disposed between the second polarizing beam splitter and the second wave plate. The interface between the prism and the total internal reflection gap is configured for allowing light beam coming from the second wave plate to pass therethrough.

In one or more embodiments, the six-primary solid-state illuminator further includes a controller. The controller is used for selectively switching on the first light source, the second light source, and the third light source. When only the first light source and the second light source are switched on, the six-primary solid-state illuminator outputs the first primary-color combination. When only the third light source is switched on, the six-primary solid-state illuminator outputs the second primary-color combination.

In one or more embodiments, in which the controller alternately switches on the first light source, the second light source, and the third light source with a sequence, such that the six-primary solid-state illuminator alternately outputs the first primary-color combination and the second primary-color combination with the sequence.

In one or more embodiments, in which the first light source is a laser source, and a peak of the first wavelength is in a range from 442 nm to 448 nm.

In one or more embodiments, in which the second light source is a laser source, and a peak of the third wavelength is in a range from 637 nm to 641 nm.

In one or more embodiments, in which the third light source is a laser source, and a peak of the fourth wavelength is in a range from 463 nm to 467 nm.

In one or more embodiments, in which the first photoluminescence device includes green phosphor, and the second wavelength is a waveband from 470 nm to 700 nm.

In one or more embodiments, in which the second photoluminescence device includes yellow phosphor, and the fifth wavelength is a waveband from 480 nm to 700 nm.

In one or more embodiments, in which the first optical module includes a lens group, in which the lens group is used for converging the first light beam on the first photoluminescence device. The second optical module includes the other lens group, in which the other lens group is used for converging the fourth light beam on the second photoluminescence device.

In one or more embodiments, in which the multi-band filter reflects light beam with wavelength in a first waveband or a second waveband and allows light beam with wavelength other than the first waveband or the second waveband to pass therethrough.

In one or more embodiments, in which the first waveband is in a range from 453 nm to 495 nm, and the second waveband is in a range from 536 nm to 620 nm.

An aspect of the present invention provides a method for providing a light source with six-primary colors. A first light source group including a first light source, a second light source, and a first photoluminescence device is provided, in which the first photoluminescence device is excited by the first light source. A second light source group including a third light source and a second photoluminescence device is provided, in which the second photoluminescence device is excited by the third light source. A multi-band filter is provided. Then, the light beams emitted from the first light source group pass through the multi-band filter and are converted to a first primary-color combination, and the light beams emitted from the second light source group are reflected at the multi-band filter and converted to a second primary-color combination. The first primary combination and the second primary combination are projected toward the same target position. A controller for switching on the first light source and the second light source of the first light source group and the third light source of the second light source group is provided. The first light source and the second light source of the first light source group and the third light source of the second light source group are alternately switched on, such that the first primary-color combination and the second primary-color combination alternately output with a sequence. The wavelength of first primary combination and the second primary combination are not overlapped each other.

An aspect of the present invention provides a six-primary solid-state illuminator including laser sources and the photoluminescence devices. The laser sources and the photoluminescence devices are used for light sources, in which some of the light beams emitted from the laser sources excite the photoluminescence devices and the others light beams source are used for light sources after reflected. With a multi-band filter, the six-primary solid-state illuminator outputs two primary-color combinations with the wavelengths not overlapped. In addition, a controller is used for selectively switching on the light sources, such that the two primary-color combinations are respectively outputted and used for the light sources in a stereoscopic display device.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

A conventional six-primary solid-state illuminator is used for providing two independent light sources, and the three primary colors of each of the independent light sources are provided by laser sources. However, the green laser source has low efficiency and high price, such that the cost of the light sources is raised. In addition, as the two independent light sources, the wavelengths of two red laser sources must be discriminative. Therefore, for choosing the proper light sources, the cost of the light sources is raised more.

A six-primary solid-state illuminator of the present invention includes laser sources and photoluminescence devices as light sources. Some of the light beams emitted from the laser sources excite the photoluminescence devices, and the other light beams emitted from the laser sources and light beams generated by excitation are used as light sources. With a multi-band filter, the six-primary solid-state illuminator outputs two primary-color combinations, in which the wavelengths of the two primary-color combinations are not overlapped. In addition, extra combining a controller, the two primary-color combinations are respectively used for providing a user with left-eye and right-eye images, such that the user can receive a stereoscopic display.

Figure 1:
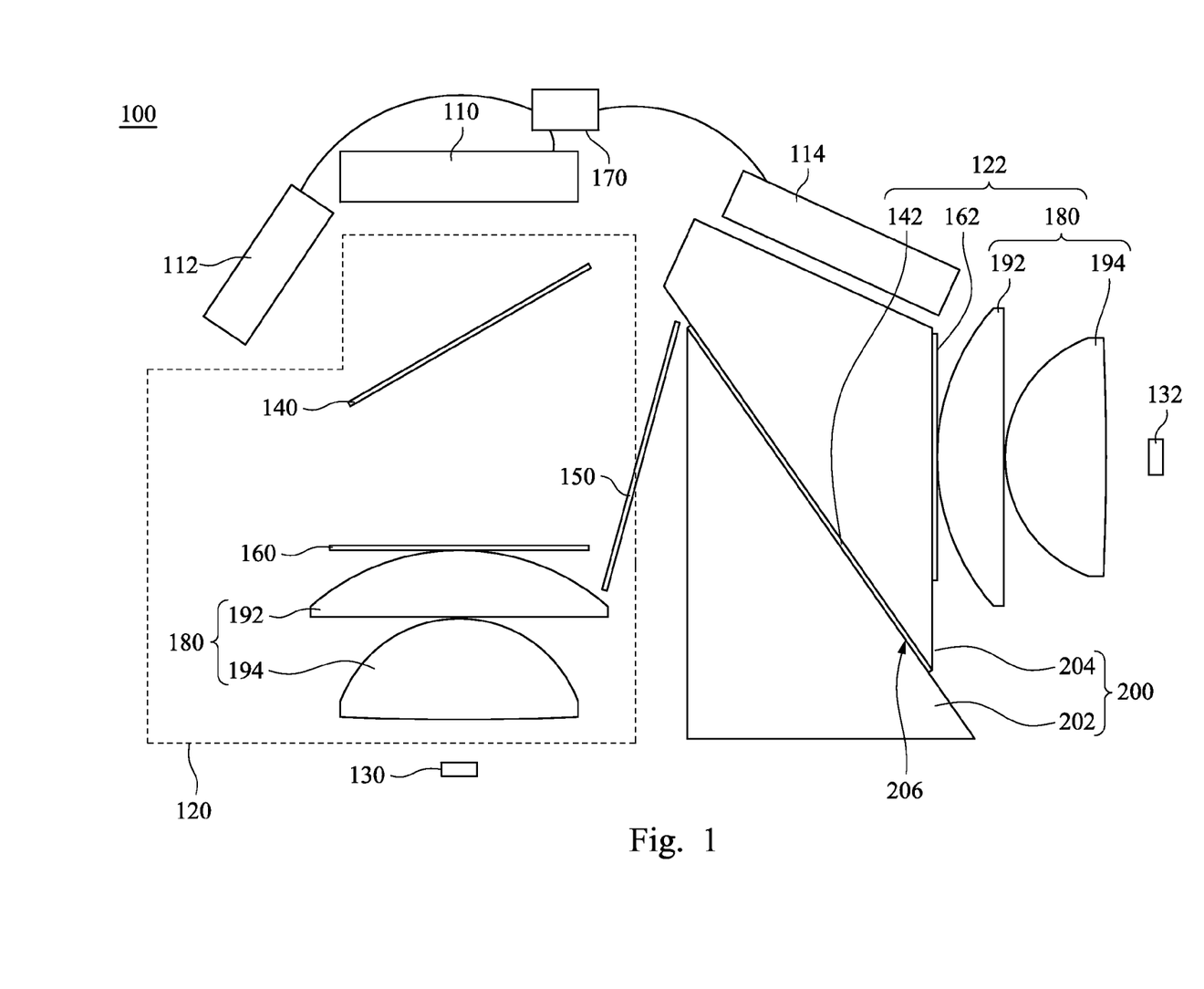
FIG. 1 is a structure schematic diagram of a six-primary solid-state illuminator according to an embodiment of the present invention.

FIG. 1 is a structure schematic diagram of a six-primary solid-state illuminator according to an embodiment of the present invention. A six-primary solid-state illuminator 100 includes a first light source 110, a second light source 112, a third light source 114, a first photoluminescence device 130, a second photoluminescence device 132, a first optical module 120, a second optical module 122, a multi-band filter 150, and a prism group 200.

The first light source 110, the second light source 112 and the first photoluminescence device 130 belong to a first light source group, and the first optical module 120 is used for guiding light beams emitted from the first light source 110, the second light source 112 and the first photoluminescence device 130.

In the first light source group, the first light source 110 is used for providing a light beam with a first wavelength, in which the first light source 110 is a laser source. A peak of the first wavelength is in a range from 442 nm to 448 nm, and thus the first light source 110 provides light beam with blue.

The second light source 112 is used for providing a light beam with a third wavelength, in which the second light source 112 is a laser source. A peak of the third wavelength is in a range from 637 nm to 641 nm, and thus the second light source 112 provides the light beam with red.

The first photoluminescence device 130 is used for providing a light beam with a second wavelength after excitation, in which the first photoluminescence device 130 includes green phosphor. The second wavelength is a waveband from 470 nm to 700 nm. In other words, the first photoluminescence device 130 provides the light beam with green.

The third light source 114 and the second photoluminescence device 132 belong to a second light source group, and the second optical module 122 is used for guiding light beams emitted from the second light source 114 and the second photoluminescence device 132.

In the second light source group, the third light source 114 is used for providing a light beam with a fourth wavelength, in which the third light source 114 is a laser source. A peak of the fourth wavelength is in a range from 463 nm to 467 nm, and thus the third light source 114 provides the light beam with blue.

The second photoluminescence device 132 is used for providing light beam with a fifth wavelength after excitation, in which the second photoluminescence device 132 includes yellow phosphor. The fifth wavelength is a waveband from 480 nm to 700 nm. In other words, the second photoluminescence device 132 provides the light beam with yellow.

Figure 2:
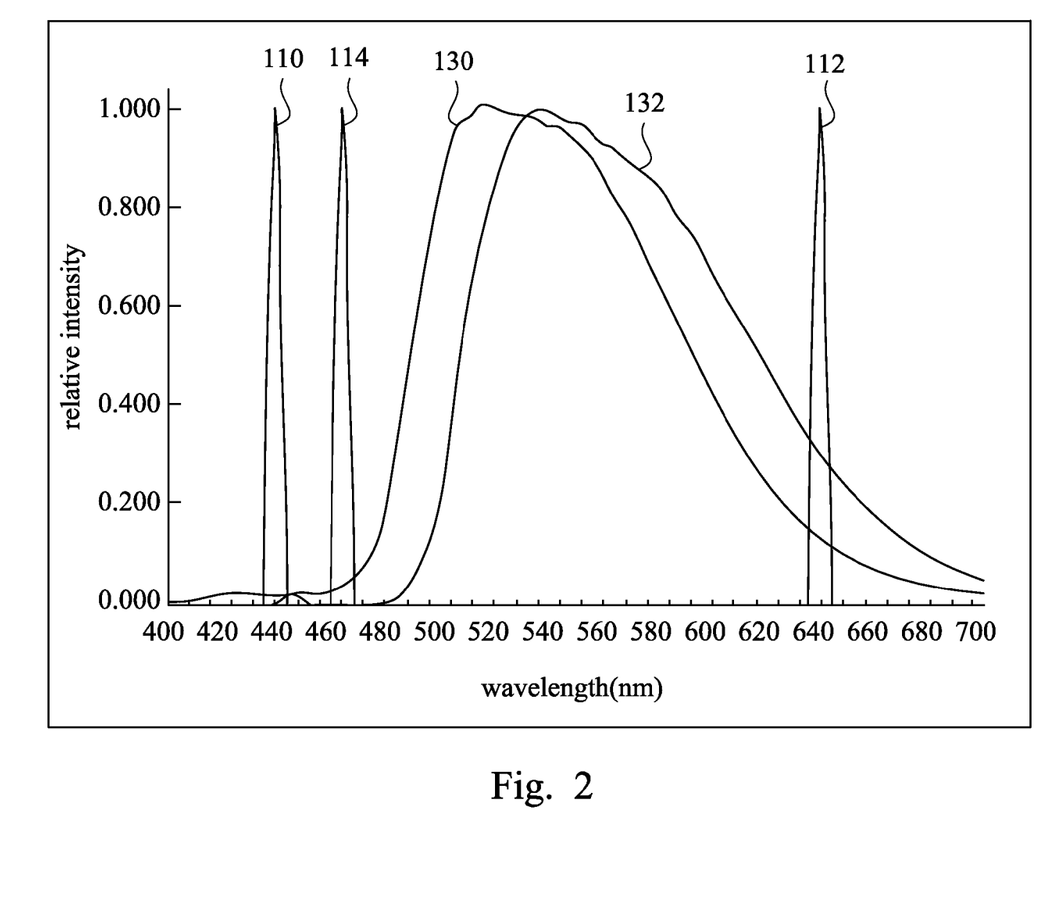
FIG. 2 is a spectral distribution of a first light source group and a second light source group of a six-primary solid-state illuminator according to an embodiment of the present invention.

In the first light source group and the second light source group, the wavelengths of the light beams emitted from the laser sources are not overlapped, and the wavebands of the light beams emitted from the photoluminescence devices are partially overlapped, as shown in FIG. 2. FIG. 2 is a spectral distribution of a first light source group and a second light source group of a six-primary solid-state illuminator according to an embodiment of the present invention. In FIG. 2, the wavelengths in sequence from the shortest to the longest are the first light source 110, the third light source 114, the first photoluminescence device 130, the second photoluminescence device 132 and the second light source 112.

The first optical module 120 is used for guiding the blue light beam emitted from the first light source 110 to the first photoluminescence device 130 for exciting. The light beams emitted from the first light source 110, the second light source 112 and the first photoluminescence device 130 are also guided and integrated to travel along the same direction by the first optical module 120. The first optical module 120 includes a first polarizing beam splitter 140, a first wave plate 160, and a lens group 180.

Figure 3:
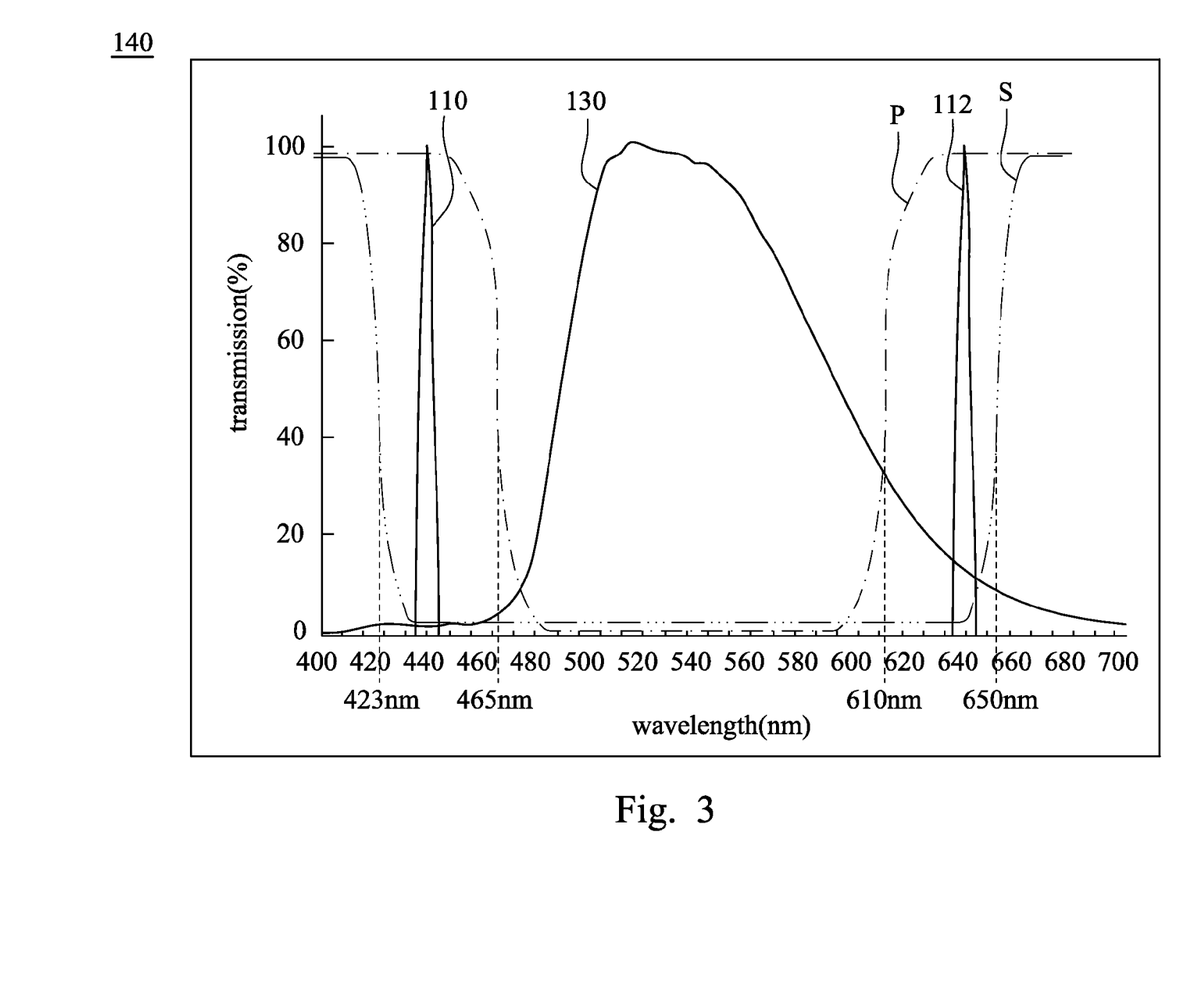
FIG. 3 is a transmission spectrum of a first polarizing beam splitter of a six-primary solid-state illuminator of the present invention.

FIG. 3 is a transmission spectrum of a first polarizing beam splitter of a six-primary solid-state illuminator of the present invention. The first polarizing beam splitter 140 has different transmission spectrums with the p-polarized light beam and the s-polarized light beam. For making the description convenient, the wavelengths of the first light source 110, the second light source 112, and the first photoluminescence device 130 are illustrated in FIG. 3.

In the transmission spectrum with the p-polarized light beam, the first polarizing beam splitter 140 reflects light beam with wavelength in a range from 465 nm to 610 nm and allows light beam with wavelength other than the range from 465 nm to 610 nm to pass therethrough.

In the transmission spectrum with the s-polarized light beam, the first polarizing beam splitter 140 reflects light beam with wavelength in a range from 423 nm to 650 nm and allows light beam with wavelength other than the range from 423 nm to 650 nm to pass therethrough.

For example, if the light beam emitted from the first light source 110 corresponding to the first polarizing beam splitter 140 is p-polarized, the light beam emitted from the first light source 110 will pass through the first polarizing beam splitter 140. On the contrary, if the light beam emitted from the first light source 110 corresponding to the first polarizing beam splitter 140 is s-polarized, the light beam emitted from the first light source 110 will be reflected at the first polarizing beam splitter 140.

On the other hand, the second light source 112 provides the same light beam as the first light source 110. Thus, the p-polarized light beam corresponding to the first polarizing beam splitter 140 passes through the first polarizing beam splitter 140, and the s-polarized light beam corresponding to the first polarizing beam splitter 140 is reflected at the first polarizing beam splitter 140.

In addition, the wave packet of the light beam with the second wavelength emitted from the first photoluminescence device 130 under excited state in the transmission spectrum of the first polarizing beam splitter 140 corresponds to reflection regardless of p polarization or s polarization. Therefore, the polarization of the light beam with the second wavelength corresponding to the first polarizing beam splitter 140 is relatively independent.

Reference is made back to FIG. 1. The first wave plate 160 of the first optical module 120 is a quarter-wave plate. After light beam passes through the first wave plate 160, the light beam with quarter phase difference is produced. The lens group 180 includes a first lens 192 and a second lens 194. The first lens 192 and the second lens 194 are configured for allowing light beam traveling through the lens group 180 toward the first photoluminescence device 130 to converge on the first photoluminescence device 130. Similarly, when light beam travels through the lens group 180 from the first photoluminescence device 130, the light beam is guided and diffused by the lens group 180 and uniformly travels.

The second optical module 122 is used for guiding the blue light beam emitted from the third light source 114 toward the second photoluminescence device 132 for exciting. The light beams emitted from the third light source 114 and the second photoluminescence device 132 are also guided and integrated to travel along the same direction by the second optical module 122. The second optical module 122 includes a second polarizing beam splitter 142, a second wave plate 162, and a lens group 180.

Figure 4:
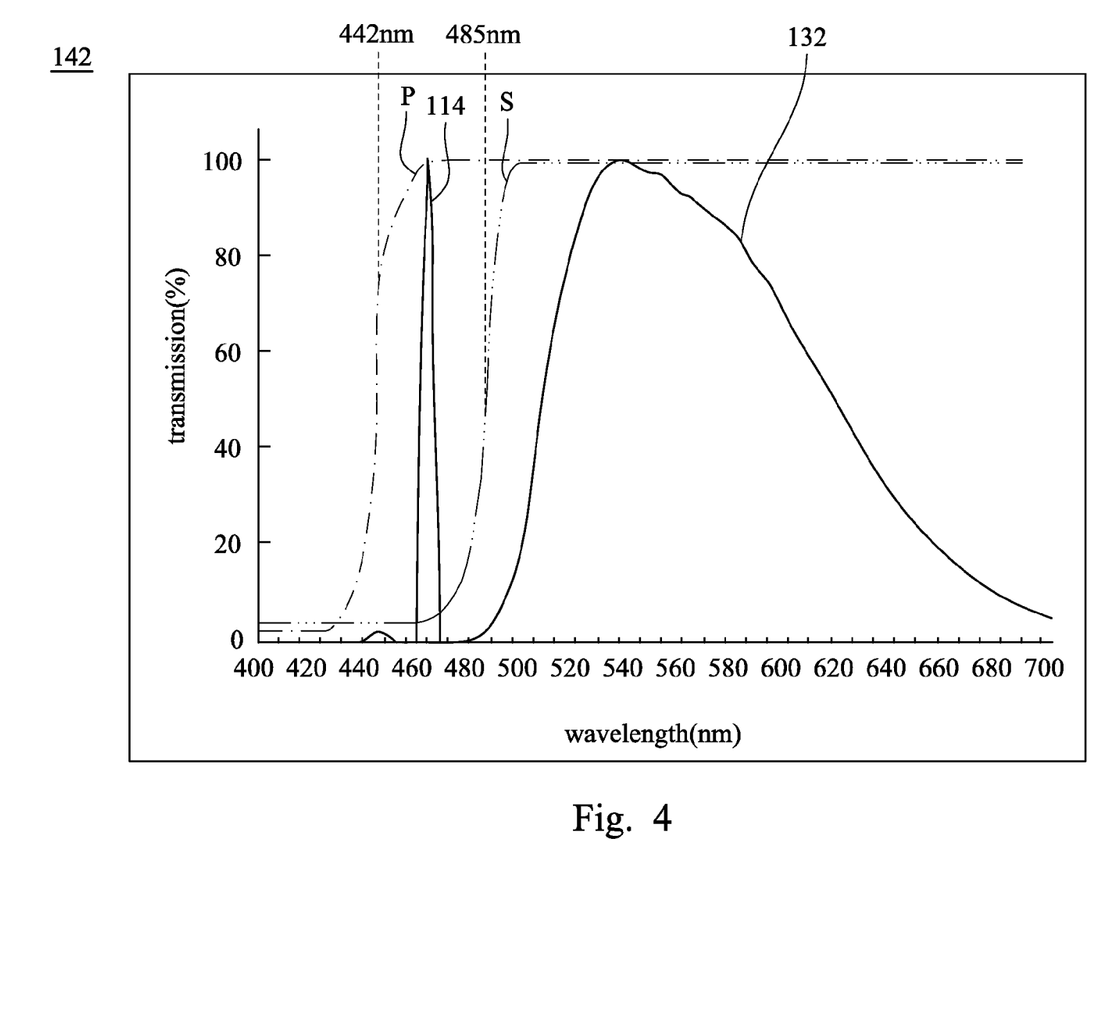
FIG. 4 is a transmission spectrum of a second polarizing beam splitter of a six-primary solid-state illuminator of the present invention.

FIG. 4 is a transmission spectrum of a second polarizing beam splitter of a six-primary solid-state illuminator of the present invention. The second polarizing beam splitter 142 has different transmission spectrums with p-polarized light beam and s-polarized light beam. For making the description convenient, the wavelengths of the third light source 114 and the second photoluminescence device 132 are illustrated in FIG. 4.

In the transmission spectrum with the p-polarized light beam, the second polarizing beam splitter 142 reflects light beam with wavelength less than 442 nm and allows light beam with wavelength above 442 nm to pass therethrough.

In the transmission spectrum with the s-polarized light beam, the second polarizing beam splitter 142 reflects light beam with wavelength less than 485 nm and allows light beam with wavelength above 485 nm to pass therethrough.

For example, if the light beam emitted from the third light source 114 corresponding to the second polarizing beam splitter 142 is p-polarized, the light beam emitted from the third light source 114 will pass through the second polarizing beam splitter 142. On the contrary, if the light beam emitted from the third light source 114 corresponding to the second polarizing beam splitter 142 is s-polarized, the light beam emitted from the third light source 114 will be reflected at the second polarizing beam splitter 142.

In addition, the wave packet of the light beam with the fifth wavelength emitted from the second photoluminescence device 132 under excited state in the transmission spectrum of the second polarizing beam splitter 142 almost corresponds to passing through the second polarizing beam splitter 142 regardless of p polarization or s polarization. Therefore, the polarization of the light beam with the fifth wavelength corresponding to the second polarizing beam splitter 142 is relatively independent.

Reference is made back to FIG. 1. The second wave plate 162 of the second optical module 122 is a quarter-wave plate. After light beam passes through the second wave plate 162, the light beam with quarter phase difference is produced. The lens group 180 includes a first lens 192 and a second lens 194. The first lens 192 and the second lens 194 are configured for allowing light beam traveling through the lens group 180 toward the second photoluminescence device 132 to converge on the second photoluminescence device 132. Similarly, when light beam travels through the lens group 180 from the second photoluminescence device 132, the light beam is guided and diffused by the lens group 180 and uniformly travels.

The light beams emitted from the first light source group and the second light source group are respectively guided by the first optical module 120 and the second optical module 122 to the multi-band filter 150. According to an embodiment, the multi-band filter 150 reflects light beam with wavelength in a first waveband or a second waveband and allows light beam with wavelength other than the first waveband or the second waveband to pass therethrough.

Figure 5:
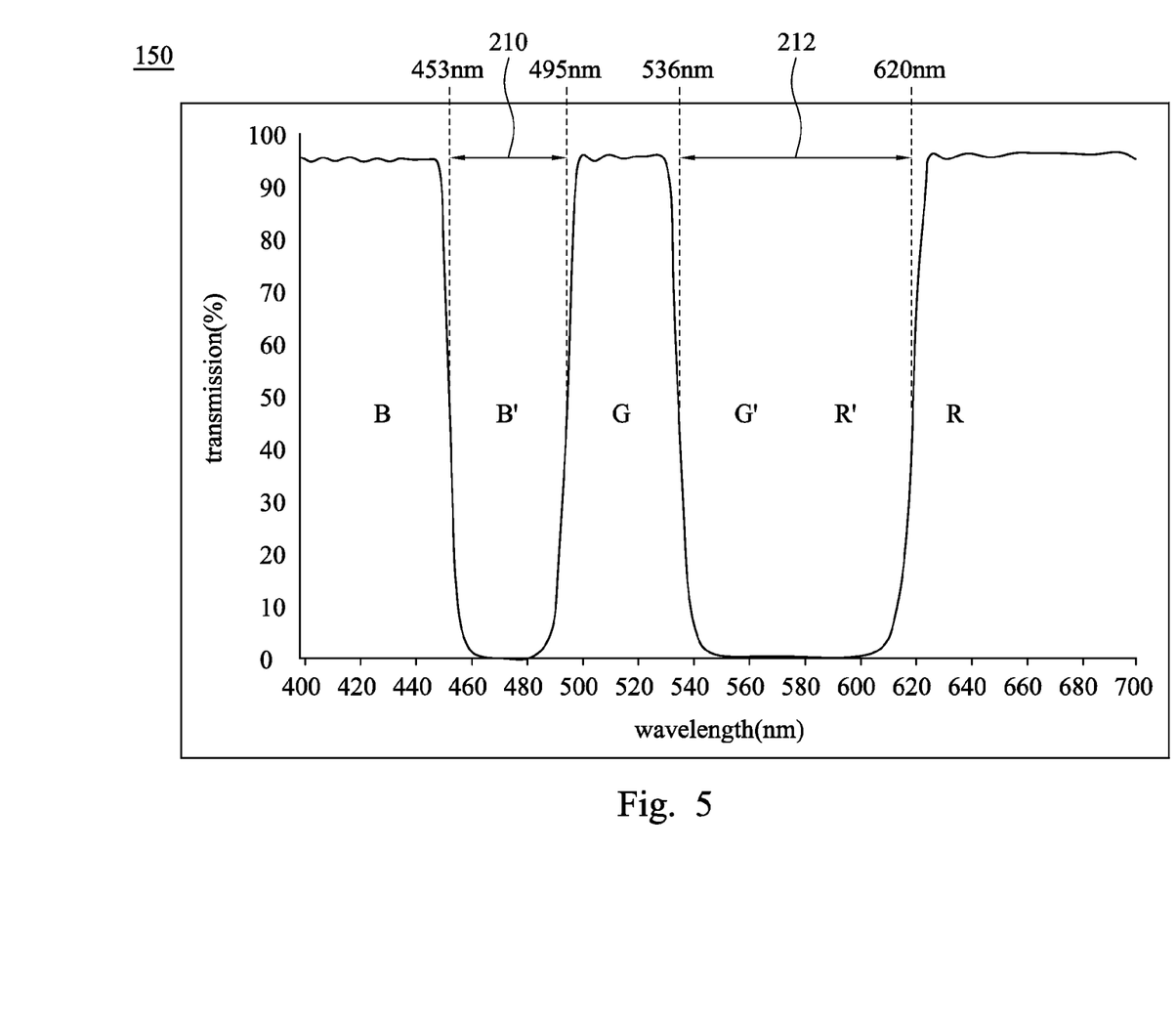
FIG. 5 is a transmission spectrum of a multi-band filter of a six-primary solid-state illuminator of the present invention.

FIG. 5 is a transmission spectrum of a multi-band filter of a six-primary solid-state illuminator of the present invention. The transmission of the multi-band filter 150 depends on the waveband, such that the transmission with the different waveband is various. According to an embodiment, when the wavelength of light beam reaching the multi-band filter 150 is in a first waveband 210 or a second waveband 212, the multi-band filter 150 reflects the light beam. The first waveband 210 is in a range from 453 nm to 495 nm, and the second waveband 212 is in a range from 536 nm to 620 nm. Conversely, when the wavelength of light beam reaching the multi-band filter 150 is other than the first waveband 210 or the second waveband 212, the multi-band filter 150 allows the light beam to pass therethrough.

Reference is made back to FIG. 1. The prism group 200 includes a first prism 202 and a second prism 204, and the first prism 202 and the second prism 204 are used for defining a total internal reflection gap 206 therebetween. An interface between the prism group 200 and the total internal reflection gap 206 is used for reflecting light beam coming from the multi-band filter 150 to a target position.

According to an embodiment, the second prism 204 of the prism group 200 is disposed between the second polarizing beam splitter 142 and the second wave plate 162, in which the second polarizing beam splitter 142 and the second wave plate 162 are respectively adhered on the second prism 204. The interface between the second prism 204 and the total internal reflection gap 206 is configured for allowing light beam coming from the second wave plate 162 to pass therethrough.

The properties and the functions of the components of the six-primary solid-state illuminator 100 are described as the foregoing embodiments. In the following embodiments, the descriptions are made to discuss the outputs of the first light source group and the second light source group.

Figure 6:
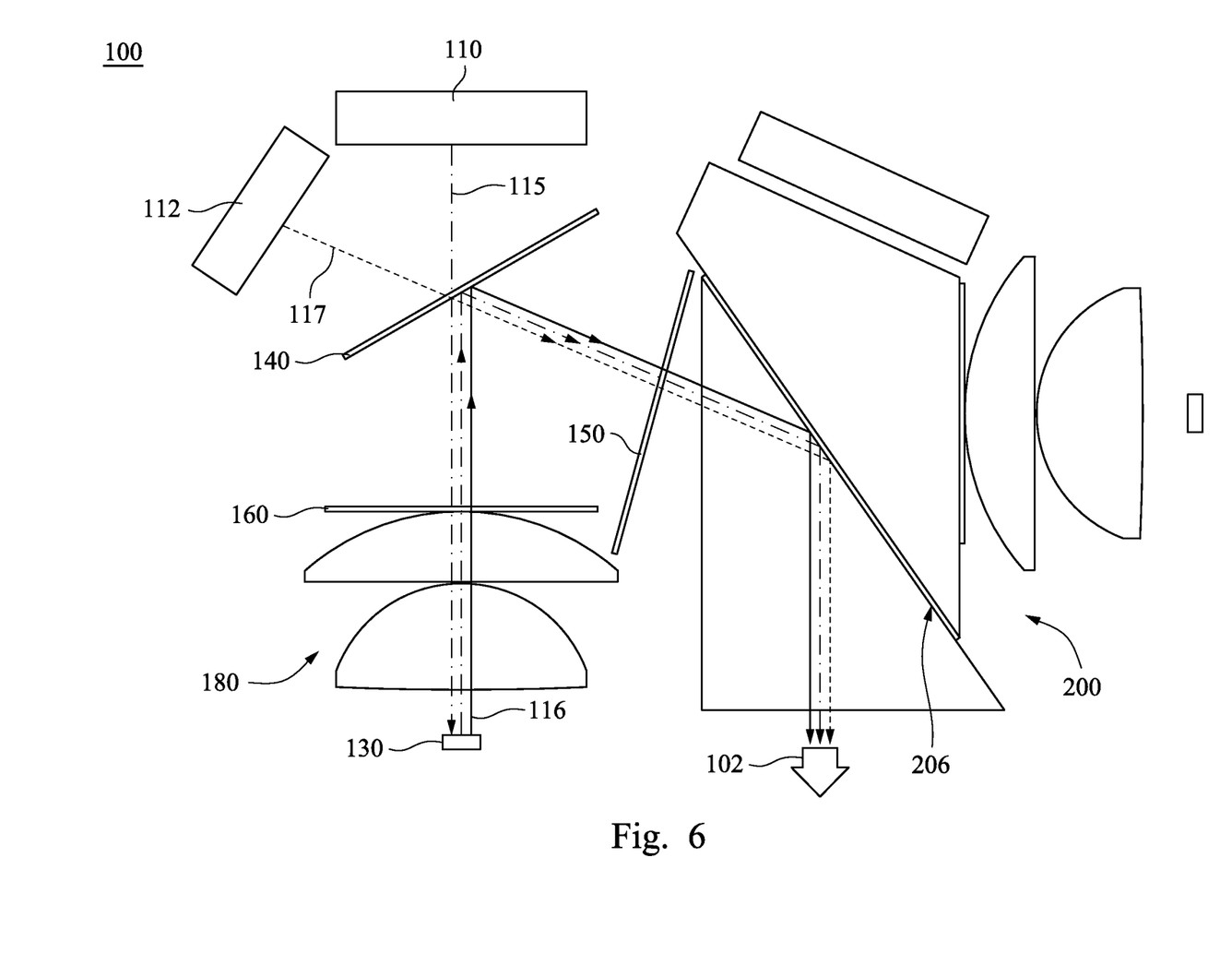
FIG. 6 is an optical path schematic diagram for a first light source group of a six-primary solid-state illuminator of the present invention.

FIG. 6 is an optical path schematic diagram for a first light source group of a six-primary solid-state illuminator of the present invention. An optical path of the present embodiment is described with FIG. 3, the transmission spectrum of the first polarizing beam splitter 140, and FIG. 5, the transmission spectrum of the multi-band filter 150. In addition, for making the drawing and description succinct, light beams emitted from the first light source 110, the second light source 112, and the first photoluminescence device 130 are respectively illustrated as one light beam. The light beam with blue emitted from the first light source 110 is a first light beam 115, the light beam with green emitted from the first photoluminescence device 130 is a second light beam 116, and the light beam with red emitted from the second light source 112 is a third light beam 117.

The first light source 110 and the second light source 112 aligning with the first polarizing beam splitter 140 respectively emit the first light beam 115 and the third light beam 117, in which the first light beam 115 and the third light beam 117 corresponding to the first polarizing beam splitter 140 are p-polarized. Therefore, as shown in FIG. 3, the p-polarized first light beam 115 and the p-polarized third light beam 117 passes through the first polarizing beam splitter 140. Then, the first light beam 115 travels toward the first photoluminescence device 130, and the third light beam 117 travels toward the multi-band filter 150.

After the first light beam 115 passes through the first polarizing beam splitter 140 and the first wave plate 160, the first light beam 115 enters the first photoluminescence device 130 through the lens group 180, in which the first light beam 115 is converged on the first photoluminescence device 130 by the guiding of the lens group 180.

Then, a part of the first light beam 115 is reflected at the first photoluminescence device 130, and the other part of the first light beam 115 excites the first photoluminescence device 130. Therefore, the first photoluminescence device 130 emits the second light beam 116 after excitation, in which the reflected first light beam 115 and the second light beam 116 travel along a direction, by and large, opposite to the original direction of the first light beam 115. The reflected first light beam 115 and the second light beam 116 are guided by the lens group 180, such that the light beams are diffused and uniformly propagate to the first polarizing beam splitter 140.

Every time the first light beam 115 passes through the first wave plate 160, the quarter phase difference of the first light beam 115 is produced. In other words, before and after the first light beam 115 is reflected at the first photoluminescence device 130, the first light beam 115 respectively passes through the first wave plate 160 once, and hence the half phase difference of the first light beam 115 is produced. After the half phase difference of the first light beam 115 is produced, the first light beam 115 corresponding to the first polarizing beam splitter 140 is converted from p polarization to s polarization.

As shown in FIG. 3, the first light beam with s polarization is reflected at the first polarizing beam splitter 140. As previously described, the second light beam 116 emitted from the first photoluminescence device 130 is reflected at the first polarizing beam splitter 140 regardless of s polarization or p polarization.

Therefore, the first light beam 115 and the second light beam 116 traveling from the first photoluminescence device 130 toward the first polarizing beam splitter 140 are reflected at the first polarizing beam splitter 140. Since the first polarizing beam splitter 140 and the first wave plate 160 are non-parallel, the first light beam 115 and the second light beam 116 which are reflected at the first polarizing beam splitter 140 and the third light beam 117 passing through the first polarizing beam splitter 140 travel toward the multi-band filter 150.

However, a person having ordinary skill in the art may choose a proper predetermined angle of the first polarizing beam splitter 140. The predetermined angle of the first polarizing beam splitter 140 is configured for allowing the first light beam 115 and the second light beam 116 reflected at the first polarizing beam splitter 140 to travel toward the multi-band filter 150.

In addition, because the third light beam 117 is not used for any effect of excitation, the second light source 122 may be disposed at a position where the third light beam 117 is directly emitted toward the multi-band filter 150 without passing through the first polarizing beam splitter 140. A direction of the third light beam 117 parallels to the direction of the first light beam 115 and the second light beam 116 reflected at the first polarizing beam splitter 140.

Reference is made back to FIG. 5. When the first light beam 115 and the third light beam 117 reach the multi-band filter 150, the first light beam 115 (peak in the range from 442 nm to 448 nm) and the third light beam 117 (peak in the range from 637 nm to 641 nm) pass through the multi-band filter 150.

In FIG. 5, the wavelength of the first light beam 115 is located at a first blue region B, and the wavelength of the third light beam 117 is located at a first red region R. Light beams with wavelength in the first blue region B and first red region R can pass through the multi-band filter 150.

The second light beam 116 emitted from the first photoluminescence device 130 has the waveband from 470 nm to 700 nm. When the second light beam 116 reaches the multi-band filter 150, the second light beam 116 with wavelength in the range from 495 nm to 536 nm and above 620 nm passes through the multi-band filter 150. In the waveband of the second light beam 116, the proportion of wavelength above 620 nm is few, and therefore the second light beam 116 emitted from the first photoluminescence device 130 and passing through the multi-band filter 150 is based on a green light beam with the wavelength in the range from 495 nm to 563 nm, as shown in a first green region G in FIG. 5.

According the above optical path, the first light beam 115, the second light beam 116, and the third light beam 117 travel toward and pass through the multi-band filter 150 with paralleling to each other. After the blue first light beam 115, the green second light beam 116, and the red third light beam 117 pass through the multi-band filter 150, the above light beams are converted to a first primary-color combination.

The interface between the prism group 200 and the total internal reflection gap 206 reflects the first primary-color combination coming from the multi-band filter 150, and the first primary-color combination then travels along a direction of an arrow 102. Thus, outputting the first primary-color combination of the six-primary solid-state illuminator 100 is completed.

Figure 7:
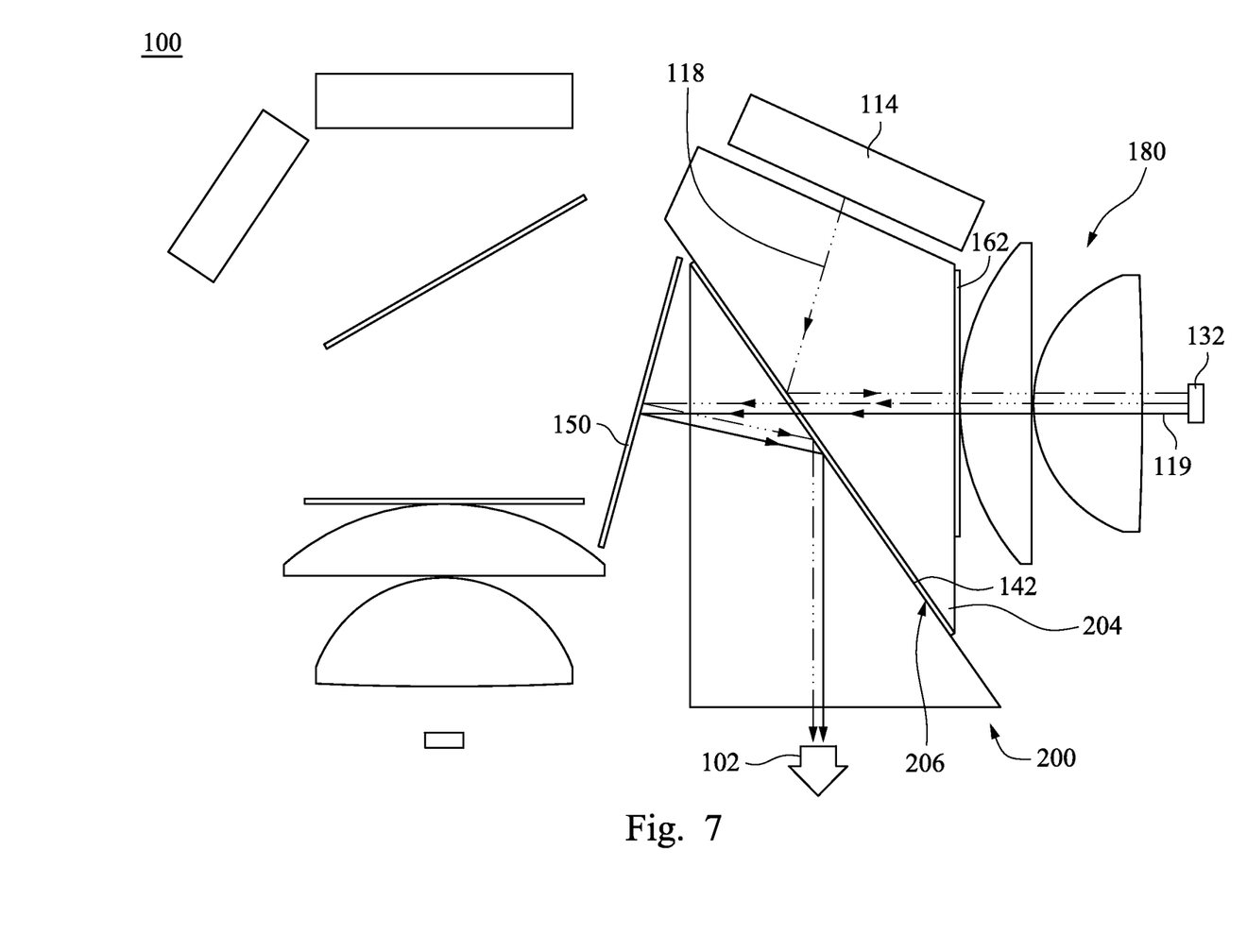
FIG. 7 is an optical path schematic diagram for a second light source group of a six-primary solid-state illuminator of the present invention.

FIG. 7 is an optical path schematic diagram for a second light source group of a six-primary solid-state illuminator of the present invention. An optical path of the present embodiment is described with FIG. 4, the transmission spectrum of the second polarizing beam splitter 142, and FIG. 5, the transmission spectrum of the multi-band filter 150. In addition, for making the drawing and the description succinct, light beams emitted from the third light source 114 and the second photoluminescence device 132 are respectively illustrated as one light beam. The blue light beam emitted from the third light source 114 is a fourth light beam 118, and the yellow light beam emitted from the second photoluminescence device 132 is a fifth light beam 119.

The third light source 114 alignes with the second polarizing beam splitter 142, and the second prism 204 of the prism group 200 is disposed between the second polarizing beam splitter 142 and the second wave plate 162. The fourth light beam 118 corresponding to the second polarizing beam splitter 142 is s-polarized, and therefore the s-polarized fourth light beam 118 is reflected at the second polarizing beam splitter 142, as shown in FIG. 4. The fourth light beam 118 passes through the second wave plate 162 after reflected at the second polarizing beam splitter 142, and then the fourth light beam 118 is guided to and converged on the second photoluminescence device 132 by the lens group 180.

Then, a part of the fourth light beam 118 is reflected at the second photoluminescence device 132, and the other part of the fourth light beam 118 excites the second photoluminescence device 132. Therefore, the second photoluminescence device 132 is excited to emit the fifth light beam 119, in which the reflected first light beam 118 and the fifth light beam 119 travel along a direction, by and large, opposite to the original direction of the fourth light beam 118. The reflected fourth light beam 118 and the fifth light beam 119 are guided and diffused by the lens group 180 and uniformly travel toward the second polarizing beam splitter 142.

Every time the fourth light beam 118 passes through the second wave plate 162, the quarter phase difference of the fourth light beam 118 is produced. In other words, before and after the fourth light beam 118 is reflected at the second photoluminescence device 132, the fourth light beam 118 respectively passes through the second wave plate 162 once, and hence the half phase difference of the fourth light beam 118 is produced. After the half phase difference of the fourth light beam 118 is produced, the fourth light beam 118 corresponding to the second polarizing beam splitter 142 is converted from s polarization to p polarization.

As shown in FIG. 4, the wavelength of the fourth light beam 118 with p polarization corresponding to the second polarizing beam splitter 142 allows the fourth light beam 118 to pass through the second polarizing beam splitter 142. On the other concept, the wavelength of the fifth light beam 119 corresponding to the second polarizing beam splitter 142 also allows the fifth light beam 119 to pass through the second polarizing beam splitter 142.

Therefore, the fourth light beam 118 and the fifth light beam 119 traveling from the second photoluminescence device 132 toward the second polarizing beam splitter 142 pass through the second polarizing beam splitter 142. According to an embodiment, the interface between the second prism 162 and the total internal reflection gap 206 is configured for allowing the fourth light beam 118 and the fifth light beam 119 coming from the second wave plate 162 to pass therethrough and travel toward the multi-band filter 150.

Reference is made back to FIG. 5. When the fourth light beam 118 reaches the multi-band filter 150, the fourth light beam 118 (peak in the range from 463 nm to 467 nm) is reflected at the multi-band filter 150. In FIG. 5, the wavelength of the fourth light beam 118 is located at a second blue region B', and therefore the fourth light beam 118 is reflected at the multi-band filter 150.

The fifth light beam 119 emitted from the second photoluminescence device 132 has the waveband from 480 nm to 700 nm. When the fifth light beam 119 reaches the multi-band filter 150, the fifth light beam with wavelength in the range from 536 nm to 620 nm is reflected at the multi-band filter 150. The fifth light beam 119 with waveband from 563 nm to 620 nm covers green and red, in which the green and the red respectively correspond to a second green region G' and a second red region R' in transmission spectrum of a multi-band filter 150.

According the above optical path, the fourth light beam 118 and the fifth light beam 119 are reflected at the multi-band filter 150 with paralleling to each other. After the fourth light beam 118 and the fifth light beam 119 are reflected at the multi-band filter 150, the fourth light beam 118 with blue and the fifth light beam 119 with yellow paralleling to each other are converted to a second primary-color combination.

The interface between the prism group 200 and the total internal reflection gap 206 reflects the second primary-color combination coming from the multi-band filter 150 along a direction of an arrow 102, and then outputting the second primary-color combination of the six-primary solid-state illuminator 100 is completed.

Figure 8:
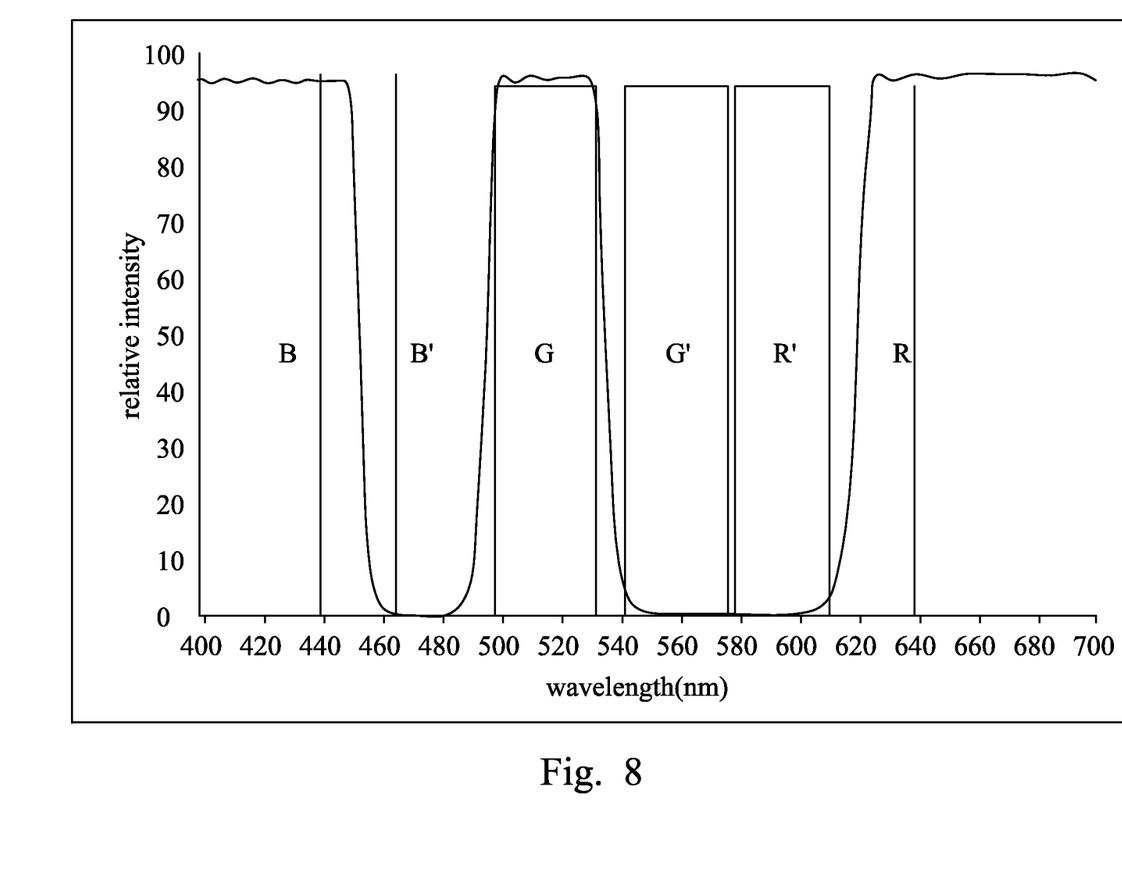
FIG. 8 is a spectral distribution of a first primary-color combination and a second primary-color combination of a six-primary solid-state illuminator according to an embodiment of the present invention.

Based on the above, the six-primary solid-state illuminator 100 of the present invention outputs the first primary-color combination and the second primary-color combination, in which the two primary-color combinations respectively have primary-color light beams of blue, green, and red, as shown in FIG. 8. FIG. 8 is a spectral distribution of a first primary-color combination and a second primary-color combination of a six-primary solid-state illuminator according to an embodiment of the present invention. The first primary-color combination covers the first blue region B, the first green region G, and the first red region R, and the second primary-color combination covers the second blue region B', the second green region G', and the second red region R'. The wavelengths of the first primary-color combination and the second primary-color combination are not overlapped each other, and the first primary-color combination and the second primary-color combination travel along the same direction (the direction of the arrow 102 in FIG. 6 and FIG. 7).

According to an embodiment, the second blue region B' of the second primary-color combination is located between the first blue region B and the first green region G of the first primary-color combination. Therefore, even though the red shift or blue shift occurs during the transmission of light beam, the blue and green light beams can keep identification such that the color interference is prevented.

In addition, the multi-band filter 150 is used for allowing the first primary-color combination and the second primary-color combination to have identification, and hence the wavelengths are not overlapped. However, a person having ordinary skill in the art may choose a proper multi-band filter 150 with various transmission spectrums.

The method for providing two primary-color combinations with the wavelengths not overlapped of the six-primary solid-state illuminator is described as the foregoing embodiments. In the following embodiments, the descriptions are made to discuss the method for operating the six-primary solid-state illuminator.

Reference is made back to FIG. 1. The six-primary solid-state illuminator 100 further includes a controller 170. The controller 170 is used for selectively switching on the first light source 110, the second light source 112, and the third light source 114. When only the first light source 110 and the second light source 112 are switched on, the six-primary solid-state illuminator 100 outputs the first primary-color combination, as shown in FIG. 6. When only the third light source 114 is switched on, the six-primary solid-state illuminator 100 outputs the second primary-color combination, as shown in FIG. 7.

According to an embodiment, the controller 170 alternately switches on the first light source 110, the second light source 112, and the third light source 114 with a sequence, such that the six-primary solid-state illuminator 100 alternately outputs the first primary-color combination and the second primary-color combination with the sequence.

Since the first primary-color combination and the second primary-color combination are made of three primary colors, the primary-color combinations can be applied as left-eye images and right-eye images for a user. Therefore, the sequence of the controller 170 is adjusted to correspond to the images. For example, when the user receives the images with 60 frames per second (FPS), the first primary-color combination and the second primary-color combination need to output the images with 60 FPS respectively. Thus, the sequence of the controller 170 is the sum of the first primary-color combination and the second primary-color combination, that is 120 FPS.

In addition, once the intensity of the red light beam of the second primary-color combination is not enough, a person having ordinary skill in the art may dispose a red light source as required. For example, a red light source can be disposed near the second light source, in which the wavelength of red light source is distinguishing from the wavelength of the second light source. Therefore, when the six-primary solid-state illuminator 100 outputs the second primary-color combination, the intensity of the red light beam of the second primary-color combination is enhanced.

As a result, the laser sources and the photoluminescence devices are used for light sources in the six-primary solid-state illuminator of the present invention, in which some of the light beams emitted from the laser sources excite the photoluminescence devices and the others light beams source are used for light sources after reflected. With the multi-band filter, the six-primary solid-state illuminator outputs two primary-color combinations with the wavelengths not overlapped. In addition, the controller is used for selectively switching on the light sources, such that the two primary-color combinations are respectively outputted and used for the light sources in the stereoscopic display device.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A six-primary solid-state illuminator, comprising:
a first light source for providing a first light beam with a first wavelength;
a first optical module, wherein the first light beam passes through the first optical module and enters a first photoluminescence device, the first photoluminescence device is excited by a part of the first light beam and provides a second light beam with a second wavelength, and the other part of the first light beam is reflected at the first photoluminescence device, wherein the reflected first light beam and the second light beam travel toward and are reflected at the first optical module;
a second light source for providing a third light beam with a third wavelength, wherein the third light beam passes through the first light optical module;
a third light source for providing a fourth light beam with a fourth wavelength;
a second optical module, wherein the fourth light beam is reflected at the second optical module and enters a second photoluminescence device, the second photoluminescence device is excited by a part of the fourth light beam and provides a fifth light beam with a fifth wavelength, and the other part of the fourth light beam is reflected at the second photoluminescence device, wherein the reflected fourth light beam and the fifth light beam travel toward and pass through the second optical module; and
a multi-band filter for receiving the first light beam, the second light beam, and the third light beam coming from the first optical module and receiving the fourth light beam and the fifth light beam coming from the second optical module, wherein the first light beam, a part of the second light beam, and the third light passing through the multi-band filter are converted to a first primary-color combination, the fourth light beam and a part of the fifth light beam reflected at the multi-band filter are converted to a second primary-color combination, wherein the first primary-color combination and the second primary-color combination travel along the same direction.

2. The six-primary solid-state illuminator of claim 1, wherein the first optical module comprises:
a first polarizing beam splitter, wherein polarization of the first light beam and the third light beam corresponding to the first polarization beam splitter is a first polarization, such that the first light beam and the third light beam pass through the first polarizing beam splitter; and
a first wave plate disposed at a side of the first photoluminescence device, such that the first light beam reflected at the first photoluminescence device passes through the first wave plate and is converted to a second polarization corresponding to the first polarizing beam splitter, wherein the first light beam with the second polarization is reflected at the first polarizing beam splitter; and
the second optical module comprises:
a second polarizing beam splitter, wherein the fourth light beam corresponding to the second polarization beam splitter is the second polarization, such that the fourth light beam is reflected at the second polarizing beam splitter; and
a second wave plate disposed at a side of the second photoluminescence device, such that the fourth light beam reflected at the second photoluminescence device passes through the second wave plate and is converted to the first polarization corresponding to the second polarizing beam splitter, wherein the fourth light beam with the first polarization passes through the second polarizing beam splitter.

3. The six-primary solid-state illuminator of claim 2, wherein the first polarization is p polarization, and the second polarization is s polarization.

4. The six-primary solid-state illuminator of claim 2, further comprising a prism group, wherein a total internal reflection gap is defined in the prism group, and an interface between the prism group and the total internal reflection gap is used for reflecting light beam coming from the multi-band filter to a target position.

5. The six-primary solid-state illuminator of claim 4, wherein the prism group comprises a prism disposed between the second polarizing beam splitter and the second wave plate, and the interface between the prism and the total internal reflection gap is configured for allowing light beam coming from the second wave plate to pass therethrough.

6. The six-primary solid-state illuminator of claim 1, further comprising a controller for selectively switching on the first light source, the second light source, and the third light source, wherein when only the first light source and the second light source are switched on, the six-primary solid-state illuminator outputs the first primary-color combination, and when only the third light source is switched on, the six-primary solid-state illuminator outputs the second primary-color combination.

7. The six-primary solid-state illuminator of claim 6, wherein the controller alternately switches on the first light source, the second light source, and the third light source with a sequence, such that the six-primary solid-state illuminator alternately outputs the first primary-color combination and the second primary-color combination with the sequence.

8. The six-primary solid-state illuminator of claim 1, wherein the first light source is a laser source, and a peak of the first wavelength is in a range from 442 nm to 448 nm.

9. The six-primary solid-state illuminator of claim 1, wherein the second light source is a laser source, and a peak of the third wavelength is in a range from 637 nm to 641 nm.

10. The six-primary solid-state illuminator of claim 1, wherein the third light source is a laser source, and a peak of the fourth wavelength is in a range from 463 nm to 467 nm.

11. The six-primary solid-state illuminator of claim 1, wherein the first photoluminescence device comprises green phosphor, and the second wavelength is a waveband from 470 nm to 700 nm.

12. The six-primary solid-state illuminator of claim 1, wherein the second photoluminescence device comprises yellow phosphor, and the fifth wavelength is a waveband from 480 nm to 700 nm.

13. The six-primary solid-state illuminator of claim 1, wherein the first optical module comprises a lens group for converging the first light beam on the first photoluminescence device, and the second optical module comprises the other lens group for converging the fourth light beam on the second photoluminescence device.

14. The six-primary solid-state illuminator of claim 1, wherein the multi-band filter reflects light beam with wavelength in a first waveband or a second waveband and allows light beam with wavelength other than the first waveband or the second waveband to pass therethrough.

15. The six-primary solid-state illuminator of claim 14, wherein the first waveband is in a range from 453 nm to 495 nm, and the second waveband is in a range from 536 nm to 620 nm.

16. A method for providing a light source with six-primary colors, comprising:

providing a first light source group comprising a first light source, a second light source, and a first photoluminescence device, wherein the first photoluminescence device is excited by the first light source;

providing a second light source group comprising a third light source and a second photoluminescence device, wherein the second photoluminescence device is excited by the third light source;

providing a multi-band filter, such that the light beams emitted from the first light source group pass through the multi-band filter and are converted to a first primary-color combination, and the light beams emitted from the second light source group are reflected at the multi-band filter and converted to a second primary-color combination, wherein the first primary combination and the second primary combination are reflected toward the same target position;

providing a controller for switching on the first light source and the second light source of the first light source group and the third light source of the second light source group; and alternately switching on the first light source and the second light source of the first light source group and the third light source of the second light source group, such that the first primary-color combination and the second primary-color combination alternately output with a sequence, wherein the wavelength of first primary combination and the second primary combination are not overlapped.

* * * * *